United States Patent [19]

Anthony

[11] 4,406,529
[45] Sep. 27, 1983

[54] TRAVELLING-MATTE PROCESSES

[76] Inventor: Dennis R. Anthony, 3116 Kelton Ave., Los Angeles, Calif. 90034

[21] Appl. No.: 339,489

[22] Filed: Jan. 15, 1982

[51] Int. Cl.³ .............................. G03B 21/26
[52] U.S. Cl. ...................... 353/30; 353/35; 353/94; 353/121; 355/46; 352/89
[58] Field of Search .......... 353/30, 35, 94, 121; 355/43, 45, 46; 352/89, 46, 47, 229; 354/117; 350/117

[56] References Cited

U.S. PATENT DOCUMENTS

| 3,040,619 | 6/1962 | Oxberry | 355/46 |
| 3,682,540 | 8/1972 | Oxberry et al. | 355/46 X |
| 3,819,264 | 6/1974 | Voorhees | 355/43 |
| 4,067,026 | 1/1978 | Pappanikolaou | 355/45 X |

FOREIGN PATENT DOCUMENTS

| 787644 | 6/1968 | Canada | 350/117 |
| 207135 | 1/1908 | Fed. Rep. of Germany | 350/117 |

Primary Examiner—Stephen Marcus
Assistant Examiner—William Sharp

[57] ABSTRACT

This invention relates to an optical method of inserting a subject image into a background image to create a composite image by projecting the background image onto a light-reflecting countermatte of the subject image and causing the subject image to appear in the non-reflective part of the countermatte. The invention includes an apparatus for carrying out the method.

3 Claims, 2 Drawing Figures

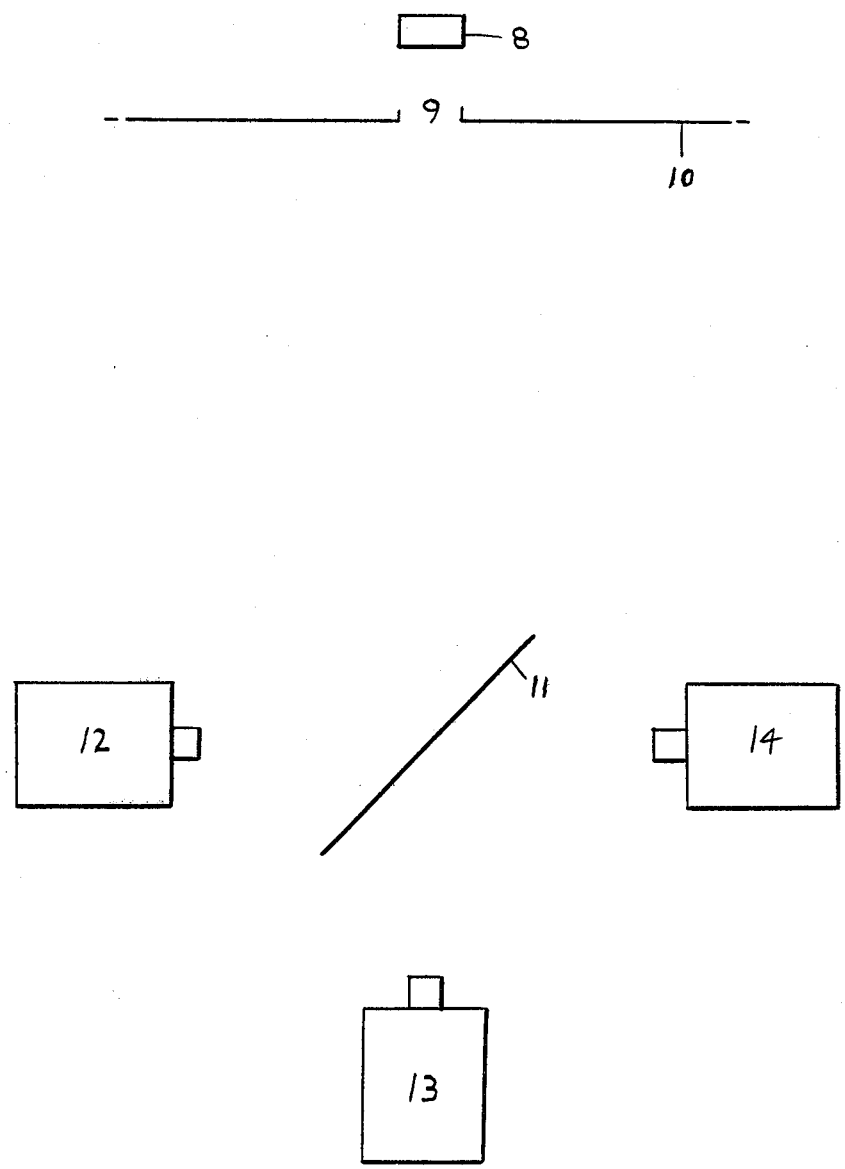

TRAVELLING-MATTE PROCESSES

This invention relates to an optical method of inserting a subject image into a background image to create a composite image by projecting the background image onto a reflective countermatte of the subject image and causing the subject image to appear in the non-reflective part of the countermatte. The invention includes an apparatus for carrying out the method.

BRIEF DESCRIPTION OF THE PRIOR ART

In modern film-making there are two standard methods of inserting a subject image into a separately photographed background image to create a composite scene: travelling-matte synthesis and front-projection photography.

Travelling-matte synthesis proceeds from a subject film made by photographing the subject against a featureless monochromatic background. Color separations (or tone separations) made from the subject film are used to create a matte, an opaque silhouette of the subject on an otherwise transparent film, and a countermatte, a transparent silhouette of the subject on an otherwise opaque film. The method comprises assembling the four component films into bipacks, the matte placed against the background film and the countermatte placed against the subject film, and then printing the bipacks, one after the other, onto fresh film. A common variation of the method substitutes the three color separations of the subject film for the subject film, placing each of them, one after the other, against the countermatte, and illuminating the resulting bipack with light passed through the appropriately colored filter to print the partial image onto the fresh film, thereby synthesizing a subject image that is, the film-maker hopes, properly color balanced with respect to the background image with which it is intimately associated.

Travelling-matte synthesis has two major drawbacks that concern the present invention. First, once the subject has been photographed it is virtually impossible to change the size of its image and its position within the photographic frame in a way that would be useful to film-makers. Second, the method of travelling-matte synthesis is one of trial and error guided by educated guesses. Mistakes are frequent and expensive.

Front-projection photography inserts a subject image into a background image by suspending the subject in front of a highly reflective screen, projecting the background image onto both the subject and the screen, and photographing the result. In practice, the screen is usually made of a material, such as Scotch Light #7610 made by the 3M Company, that will reflect as much as 200 times the amount of light reflected by white cloth. The front-projection apparatus comprises a projector and a viewer (e.g. a film camera) whose optical axes cross at a right angle and a beam splitter, a thin, optically perfect sheet of glass, that bisects that right angle where the axes cross. Because reflection from the beam splitter makes the background image seem to emanate from the viewer, the shadow that the subject casts on the screen is hidden from the viewer by the subject itself. And because the screen is so much more reflective than the subject is likely to be, that part of the background image that falls on the subject will be washed out in the light necessary to make the subject visible to the viewer.

In front-projection photography the position of the subject image in the photographic frame is usually changed by tilting or panning the front-projection apparatus, thereby shifting the position of the background image and the camera's field of view while the subject actually remains stationary. Changes in the relative size of the subject image in the photographic frame are accomplished by spreading the background image and the camera's field of view over a larger or smaller area of the screen. This effect is accomplished either by moving the front-projection apparatus closer to or further from the screen or by equipping the projector and camera with and using identical zoom lenses that are slaved together (i.e. Zoran Perisic's Zoptic System).

The major drawback to front-projection photography that concerns the present invention is the necessity of using a front-projection screen large enough to contain the background image when it has spread wide enough to make the subject appear as small as the film-maker desires. If the subject is one that cannot be replaced by a scale model (e.g. a live actor) and if the subject image is to occupy only a small percentage of the photographic frame, then a screen hundreds of feet high and wide will be needed. Such an arrangement is impractical.

The present invention combines the best features of travelling-matte synthesis and front-projection photography into a method and an apparatus that display none of the aforementioned drawbacks.

SUMMARY OF THE INVENTION

In the prior art mattes and countermattes are made on black-and-white film so that their opaque areas will function as totally absorbant barriers to the passage of light. I have discovered that mattes and countermattes can be made so that their opaque areas are highly reflective like the material of a front-projection screen. Therefore, according to the present invention a method of optically inserting a subject image into a background image to create a composite image comprises placing a subject film behind or projecting its image onto the rear of a countermatte, the front of whose opaque areas is highly reflective, and projecting the background image onto the front of the countermatte. A second method comprises placing a background film behind or projecting its image onto the rear of a matte, the front of whose opaque areas is highly reflective, and projecting the subject image onto the front of the matte.

A third method of the invention comprises placing a subject film behind or projecting its image onto the rear of a countermatte, the front of whose opaque areas is highly reflective, which countermatte is so placed behind a highly reflective screen that its front is visible through a hole cut into the screen, and projecting the background image onto the front of the screen.

A fourth method of the invention comprises making a front-projection matte by placing a light-absorbing layer behind a countermatte whose opaque areas are highly reflective or by placing a highly reflective layer behind a matte comprising a light-absorbing silhouette on otherwise transparent film, projecting the background image onto the front-projection matte, and projecting the subject image through a countermatte and directly into the viewer by such reflection from a beam splitter that the subject image appears to the viewer to be emanating from the light-absorbing areas of the front-projection matte.

A fifth method of the invention comprises placing a front-projection matte on or adjacent the rear of a hole cut into a highly reflective screen, projecting the background image onto the front of the screen, and projecting the subject image through a countermatte and directly into the viewer by such reflection from a beam splitter that the subject image appears to the viewer to be emanating from the light-absorbing areas of the front-projection matte.

In this specification it is understood that the term "viewer" refers to a camera as well as to a device through which one actually looks, such as a viewfinder, and to a lens or lens system that projects the composite image into another optical system. It is also understood that the term "film gate" refers to that part of a projector comprising the aperture and pressure plate unit through which film is advanced to be illuminated or to any similar mechanism and the term "film-gate apparatus" refers to a film gate and the mechanism that advances film through it. It is also understood that the term "front-projection apparatus" refers to a projector, a beam splitter, and a viewer and the term "screen" refers to any two-dimensional surface, solid or liquid, upon which an image may be focussed.

BRIEF DESCRIPTION OF THE DRAWINGS

The invention will now be described by way of example with reference to the accompanying drawings in which:

FIG. 2 is a diagrammatic plan view of an alternative embodiment of an apparatus for carrying out the method of the invention.

DESCRIPTION OF THE PREFERRED EMBODIMENTS

Figure 1:
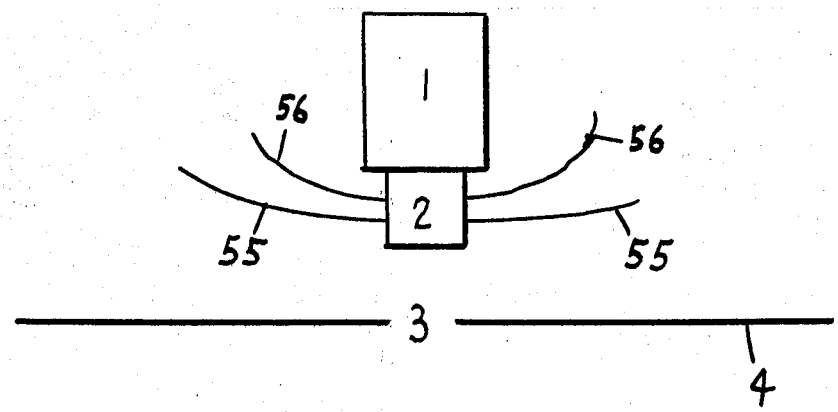
FIG. 1 is a diagrammatic plan view of one embodiment of an apparatus for carrying out the method of the invention.
Figure 1:
Figure 1:
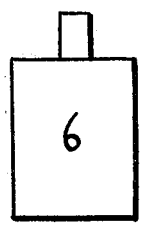

In the embodiment of FIG. 1 of the drawings an optical system comprises a subject projector 1 with a film gate 2 on or adjacent the rear of a hole 3 cut into a highly reflective screen 4 facing a front-projection apparatus which comprises a beam splitter 5, a viewer 6, and a background projector 7. This embodiment is used to carry out the method of the invention in the following way:

A countermatte 55 of the subject film 56, so made that the front of its opaque areas is highly reflective, is loaded into the subject projector 1 so that it advances through the film gate 2. The subject film 56 is located into the subject projector 1 behind the countermatte 55, either so that it advances through the film gate 2 with the countermatte 55 or so that it advances through another film gate behind the film gate 2, such that the subject image is visible to the viewer 6 through the transparent areas of the countermatte 55. The background image into which the subject image is to be inserted is projected by the background projector 7 via reflection from beam splitter 5 onto the front-projection screen 4 such that part of the background image falls into the hole 3 and onto the countermatte 55 in film gate 2. Because the opaque areas of the countermatte 55 reflect light just as the front-projection material of the screen 4 does, the scene visible to the viewer 6 will comprise the subject image with the background image extending to its edges and occupying all areas not occupied by the subject image.

Because the subject film and the dyes in it may reflect some of the light falling on it from the front it will usually be desirable to project the background image with polarized light and to put between the countermatte and the subject film a layer of polarizing material whose direction of polarization is perpendicular to that of the light projected onto the front of the countermatte. That layer of polarizing material will thus absorb that part of the background image that passes through the transparent part of the countermatte and will prevent it from being reflected back to the viewer.

In some applications of the invention the depth of field into which the background image is focussed will be thinner than the distance between the front of the hole 3 in the screen 4 and the film plane of the film gate 2. For such cases the subject projector 1 may be moved a distance away from the screen 4 and a lens or lens system so placed between the hole 3 and the film gate 2 that light focussed at the front of the hole 3 will also be focussed onto the film plane of the film gate 2.

The screen 4 is not necessary to the creation of a composite image from the subject film and the background film: the background image could be projected entirely onto the countermatte 55 in the film gate 2. The front-projection screen 4 functions as an extension of the countermatte 55 onto which the background image and the viewer's field of view may be expanded, either by moving the front-projection apparatus 5, 6 and 7 away from the screen or by using zoom lenses on the viewer 6 and background projector 7, or may be shifted, either by moving the front-projection apparatus 5, 6, and 7 laterally or vertically parallel to the plane of the screen or by tilting and panning it. By such techniques the subject image can be made to appear to grow smaller or larger with respect to the background image or to change its position within the background image.

If such changes in the relation between the subject image and the background image are not needed, then there is another way to insert the subject image into the background image, one that requires the apparatus diagrammed in FIG. 1. without the screen 4. A matte made from the subject film and so made that its opaque areas are highly reflective is loaded into the subject projector 1 so that it advances through the film gate 2. The background film is loaded into the subject projector 1 behind the matte, either advancing through the film gate 2 with it or advancing by itself through another film gate behind the film gate 2. The subject film is loaded into the background projector 7. A nonreflective countermatte may be loaded into the background projector 7 with the subject film, either advancing through the same film gate with it or advancing through a separate film gate, or the subject image may be projected onto the film gate 2 of the subject projector 1 with light so polarized that a layer of polarizing material between the matte film in the film gate 2 and the background film will absorb any light from the background projector 7 that passes through the transparent areas of the matte. The background projector 7 will be so aimed at the beam splitter 5 that the subject image will be projected onto the reflective areas of the matte, thereby creating a composite image visible to the viewer 6.

In the embodiment of FIG. 2 of the drawings an alternative optical system comprises a film-gate apparatus 8 on or adjacent the rear of a hole 9 cut into a highly reflective screen 10; a front-projection apparatus comprising a beam splitter 11, a background projector 12, and a viewer 13; and a subject projector 14 so positioned that it will project an image into the viewer 13 by reflecting it from the beam splitter 11.

One of two kinds of front-projection matte will be loaded into the film-gate apparatus 8. The first kind of front-projection matte comprises a countermatte made from the subject film and so made that the front of its opaque areas is highly reflective, said countermatte being placed in front of light-absorbing material, the said light-absorbing material being a layer attached to the back of the countermatte, a layer on a separate piece of film advanced with the countermatte, or a part of the film-gate apparatus 8. The second kind of front-projection matte comprises a matte made from the subject film and so made that its opaque areas absorb light, said matte being placed in front of a highly reflective material, the said reflective material being a layer attached to the back of the matte, a layer on a separate piece of film advanced with the matte, or a part of the film-gate apparatus 8.

The background image emanates from the background projector 12, part of it reflects from the beam splitter 11, and falls onto the screen 10. The light-absorbing part of the front-projection matte creates a black spot the size and shape of the subject image in the background image projected onto the screen 10 and visible to the viewer 13.

The subject film is loaded into the subject projector 14 with a nonreflective countermatte. The subject projector is so located in the optical system that the subject image emanating from it reflects from the beam splitter 11 and falls into the viewer 13 in such a way that the subject image seems to be emanating from the light-absorbing areas of the front-projection matte in the film-gate apparatus 8. Thus the subject image and the background image are united in a composite image visible to the viewer 13.

The subject image may be made to appear larger or smaller relative to the background image by one of two methods. If the background projector 12 and the viewer 13 are equipped with zoom lenses and if those zoom lenses are used to spread the background image and the viewer's field of view over larger or smaller areas of the screen 10, then no adjustment of the subject projector will be necessary: the projected subject image will maintain its correct relation to the front-projection matte as seen by the viewer 13. If the front-projection apparatus comprising the beam splitter 11, the background projector 12, and the viewer 13 is moved toward or away from the screen 10 to make the background image and the viewer's field of view contract or expand on the screen 10, then the subject projector 14 must move toward or away from the screen 10 with the front-projection apparatus and either it must move toward or away from the beam splitter 11 by the same increment of distance or it must be equipped with a zoom lens that will widen or narrow the projected subject image visible to the viewer 13 to compensate for the apparent widening and narrowing of the front-projection matte.

The subject image may be made to appear to move across the background image by means of a two-part technique. First, the subject projector 14, the beam splitter 11, and the background projector 12 are revolved as a unit about the optical axis of the viewer 13 while the subject projector 14 and the background projector 12 are revolved each about its own optical axis such as to maintain the correct orientation of the subject image and the background image relative to the front-projection matte. This process of revolutions proceeds until the plane defined by the optical axes of the viewer 13 and the background projector 12 intersects the screen 10 on a line that parallels the direction in which the subject image is to appear to move. Second, the viewer 13 and the background projector 12 are revolved by equal angles in opposite directions about an axis that intersects both of their optical axes and is perpendicular to both of their optical axes.

I claim:

1. A method of inserting the image of a subject into the image of a separately photographed background to create a composite image, which method comprises placing an illuminated film of the subject behind a reflective countermatte of the said subject and projecting the background image onto the front of the countermatte.

2. The method of claim 1 in which the countermatte is overlapped by reflective material and the background image is projected onto both the countermatte and the overlapping reflective material.

3. A method of inserting the image of a subject into the image of a separately photographed background to creat a composite image, which method comprises projecting the background image onto a light-absorbing silhouette of the subject and onto light-reflecting material adjacent to the said silhouette by way of a beam splitter and so projecting the subject image onto the said beam splitter that it appears to be emanating from the said light-absorbing silhouette.

* * * * *